US012637054B1

(12) United States Patent
Calahan et al.

(10) Patent No.: US 12,637,054 B1
(45) Date of Patent: May 26, 2026

(54) VEHICLE WITH MULTIPLE INERTIAL MEASUREMENT UNITS

(71) Applicant: Parker-Hannifin Corporation, Cleveland, OH (US)

(72) Inventors: Mark Calahan, Sebastopol, CA (US); Kyle J. Merrill, Chuckey, TN (US); Alyn G. Brown, Nashville, IN (US); Todd A. Link, Gray, TN (US); Jason S. Richardson, Chuckey, TN (US); Randall D. Thompson, Lancaster, SC (US)

(73) Assignee: Parker-Hannifin Corporation, Cleveland, OH (US)

( * ) Notice: Subject to any disclaimer, the term of this patent is extended or adjusted under 35 U.S.C. 154(b) by 46 days.

(21) Appl. No.: 18/631,710

(22) Filed: Apr. 10, 2024

Related U.S. Application Data

(60) Provisional application No. 63/504,554, filed on May 26, 2023.

(51) Int. Cl.
B60W 10/08 (2006.01)
A01D 34/78 (2006.01)
(Continued)

(52) U.S. Cl.
CPC ............. B60W 10/08 (2013.01); A01D 34/78 (2013.01); A01D 69/02 (2013.01); B60W 10/30 (2013.01);
(Continued)

(58) Field of Classification Search
CPC ................. B60W 10/08; B60W 10/30; B60W 2050/0022; B60W 2300/156;
(Continued)

(56) References Cited

U.S. PATENT DOCUMENTS 9,423,250 B1    8/2016  Troy
10,058,031 B1 *  8/2018  Brown ................. B60K 7/0007
(Continued)

FOREIGN PATENT DOCUMENTS

AU        2021200891 B2    3/2021
CN        206252617 U      6/2017
(Continued)

OTHER PUBLICATIONS

R.S. Ramya et al., "Remote Controlled Electric Lawn Mower using Embedded System", International Journal of Science, Engineering and Technology, 2020.

*Primary Examiner* — Brian P Sweeney
(74) *Attorney, Agent, or Firm* — McDonnell Boehnen Hulbert & Berghoff LLP

(57)                ABSTRACT

An example vehicle includes: at least one electric motor that propels the vehicle; at least one drive motor controller that controls the at least one electric motor to propel the vehicle; and a plurality of inertial measurement unit (IMU) modules coupled to various locations on the vehicle including the at least one drive motor controller or the at least one electric motor, wherein the plurality of IMU modules provide sensor information indicative of one or more of heading, acceleration, or orientation of the vehicle, wherein the at least one drive motor controller receives the sensor information from the plurality of IMU modules, and responsively adjusts operation of the at least one electric motor based on the sensor information.

20 Claims, 9 Drawing Sheets

(51) Int. Cl.

| | |
|---|---|
| *A01D 69/02* | (2006.01) |
| *A01D 101/00* | (2006.01) |
| *B60W 10/30* | (2006.01) |
| *B60W 50/00* | (2006.01) |

(52) U.S. Cl.

CPC . *A01D 2101/00* (2013.01); *B60W 2050/0022* (2013.01); *B60W 2300/156* (2013.01); *B60W 2400/00* (2013.01); *B60W 2520/06* (2013.01); *B60W 2520/16* (2013.01); *B60W 2710/08* (2013.01)

(58) Field of Classification Search

CPC ......... B60W 2400/00; B60W 2520/06; B60W 2520/16; B60W 2710/08; A01D 34/78; A01D 69/02; A01D 2101/00

See application file for complete search history.

(56) References Cited

U.S. PATENT DOCUMENTS

| | | | |
|---|---|---|---|
| 10,775,784 | B2 | 9/2020 | Gu |
| 2014/0316626 | A1 | 10/2014 | Amano |
| 2018/0162226 | A1 | 6/2018 | Shin |
| 2019/0031014 | A1 | 1/2019 | Yoshizawa |
| 2019/0378360 | A1 * | 12/2019 | Bergenholm ........ G05D 1/0088 |
| 2021/0215483 | A1 | 7/2021 | Krone |
| 2022/0050455 | A1 | 2/2022 | Byrnes |
| 2023/0066919 | A1 | 3/2023 | Navin et al. |

FOREIGN PATENT DOCUMENTS

| | | | | |
|---|---|---|---|---|
| EP | 3807116 | B1 * | 3/2022 | ............. A01D 34/64 |
| KR | 10-1649538 | B1 | 8/2016 | |
| WO | 2022/178413 | A1 | 8/2022 | |

* cited by examiner

100

500

100

600

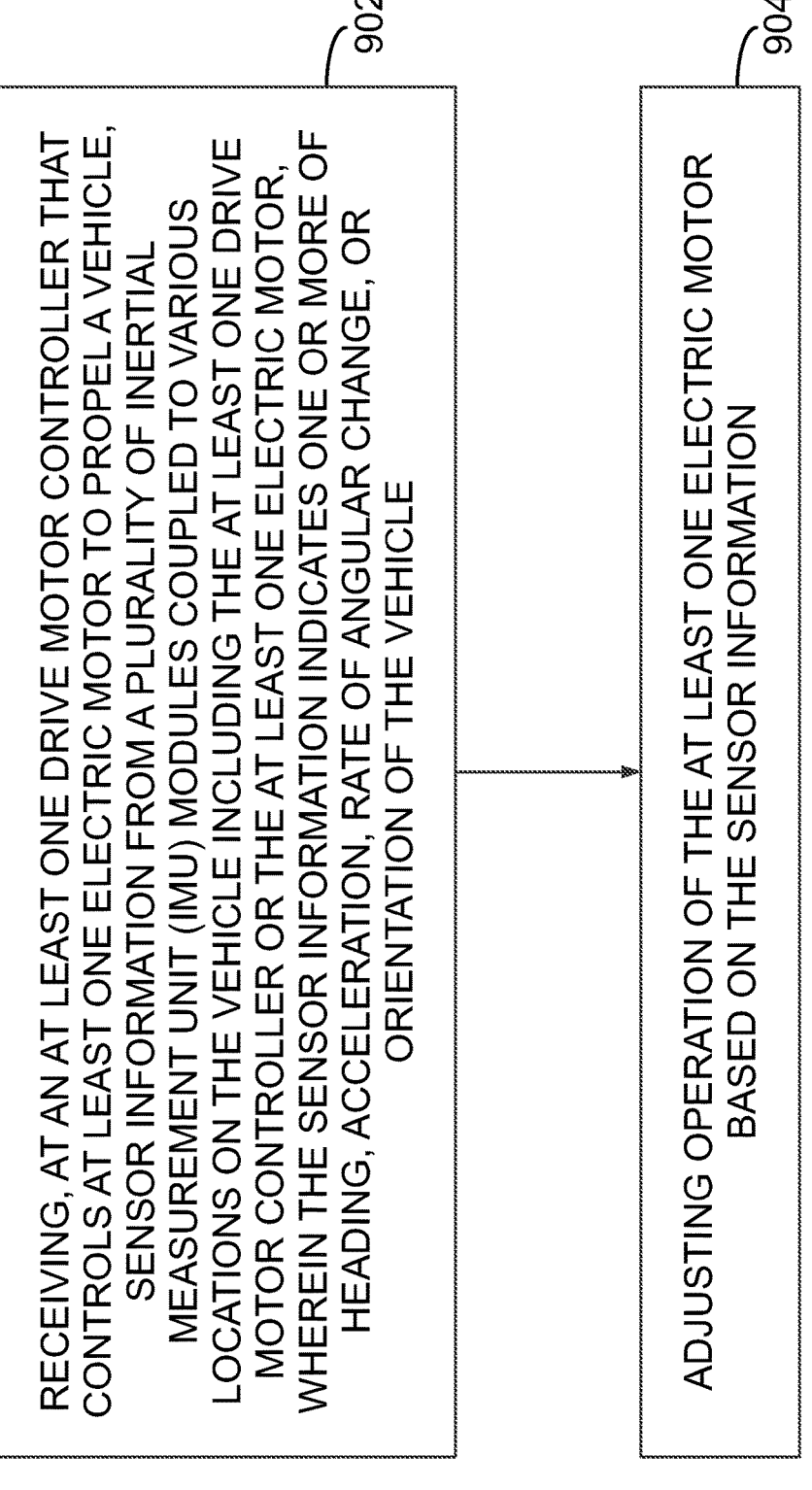

900

902

RECEIVING, AT AN AT LEAST ONE DRIVE MOTOR CONTROLLER THAT CONTROLS AT LEAST ONE ELECTRIC MOTOR TO PROPEL A VEHICLE, SENSOR INFORMATION FROM A PLURALITY OF INERTIAL MEASUREMENT UNIT (IMU) MODULES COUPLED TO VARIOUS LOCATIONS ON THE VEHICLE INCLUDING THE AT LEAST ONE DRIVE MOTOR CONTROLLER OR THE AT LEAST ONE ELECTRIC MOTOR, WHEREIN THE SENSOR INFORMATION INDICATES ONE OR MORE OF HEADING, ACCELERATION, RATE OF ANGULAR CHANGE, OR ORIENTATION OF THE VEHICLE

904

ADJUSTING OPERATION OF THE AT LEAST ONE ELECTRIC MOTOR BASED ON THE SENSOR INFORMATION

FIG. 9

VEHICLE WITH MULTIPLE INERTIAL MEASUREMENT UNITS

CROSS REFERENCE TO RELATED APPLICATION

The present application claims priority to U.S. Provisional Application No. 63/504,554 filed on May 26, 2023, the entire contents of which are herein incorporated by reference as if fully set forth in this description.

BACKGROUND

The market is transitioning hydraulically controlled vehicles (e.g., a mower, a skid steer, etc.) to electric drives. Such vehicles are expected to operate in different environmental conditions.

For example, a vehicle can operate on flat ground or on hilly terrain. Performance parameters of the vehicle under one set of conditions (e.g., flat ground) may be tuned to adapt the vehicle to such conditions. However, such tuned parameters might not render the vehicle operating in an acceptable manner under a different set of conditions (e.g., hilly ground).

It may be desirable to adjust the performance parameters of the vehicle based on the conditions in which the vehicle operates. It may also be desirable to have multiple IMUs attached to various components of the vehicle to provide sufficient data to determine a condition of the vehicle. It is with respect to these and other considerations that the disclosure made herein is presented.

SUMMARY

The present disclosure describes implementations that relate to a vehicle with multiple inertial measurement units.

In examples, this disclosure describes multiple inertial measurement units (IMUs) embedded within respective individual components of a vehicle. Within examples, the disclosure describes modifying the performance and safety parameters of a vehicle and providing predictive maintenance indications based on information from multiple EIUs embedded within respective components of the vehicle.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 9 is a flowchart of a method for operating a vehicle, according to an example implementation.

DETAILED DESCRIPTION

Electronically-controlled vehicles may have an infinite amount of adjustability to the drive and control feel. Particularly, parameters such as electric current limit, voltage, and acceleration rates of electric motors, throttle inputs, gains of feedback control loops, and other parameters can be adjusted or tuned to enhance the performance and drive feel of the vehicle.

Such tuning may differ based on the operating conditions of the vehicle. For example, the vehicle can be tuned to have enhanced performance on flat ground. When operating on a hilly terrain, the tuning suitable for flat ground might not lead to good performance on the hilly terrain. For example, on a hilly terrain, higher power and torque levels may be desirable in order to obtain the desired performance. On the other hand, on flat ground, less power and torque may be desirable to prevent wheel scuffing or damage to the ground or surface on which the vehicle operates. As such, it may be desirable to re-tune the vehicle for good performance on hilly terrain.

Disclosed herein are methods, systems, and vehicles that involve multiple IMUs attached to various components of the vehicle. The disclosed methods, systems, and vehicle also involve receiving data from the multiple IMUs to detect one or more of the position, heading, acceleration, or orientation of the vehicle in real time, and tuning the parameters of the vehicle for enhanced performance over a wide range of conditions and terrains. Particularly, the disclosed methods, systems, and vehicles involve using data received from the multiple IMUs to adjust certain parameters or characteristics of the vehicle pro-actively to adapt to various conditions and terrains. Data from the IMUs can also provide predictive maintenance indications for various components of a vehicle.

Figure 1A:
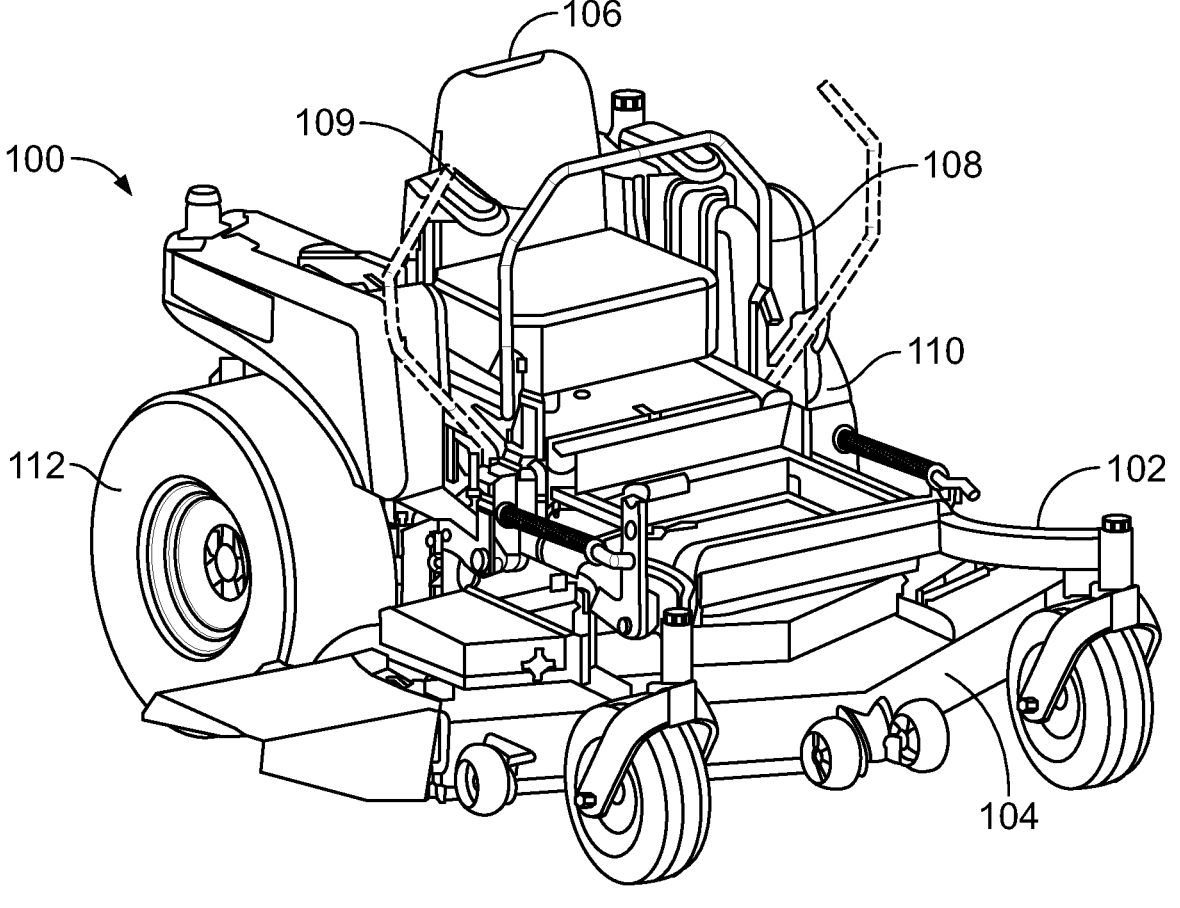
FIG. 1A illustrates a perspective view of a mower, according to an example implementation.

FIG. 1A illustrates a perspective view of a vehicle 100, according to an example implementation. The vehicle 100 can be, for example, a ZTR mower (e.g., a lawn mower with a turning radius that is effectively zero). A ZTR mower is used herein as an example of a vehicle. The implementations described herein can be used with other vehicles such as other types of mowers, mini skid steer machines, etc.

The vehicle 100 includes a frame 102. The vehicle 100 also includes a mower deck 104 supported by the frame 102. The mower deck 104 can house one or more blades (e.g., three blades) for mowing grass, for example. The vehicle 100 further includes an operator seat 106 and steering control levers 108, 109 for operating the vehicle 100. The steering control levers 108, 109 are shown in FIG. 1A as lap bars, but other configurations (e.g., joysticks, pedals, etc.) could be used. As such, the steering control levers 108, 109 can be referred to generally as vehicle movement input devices.

In examples, a rear mounted engine (not shown) can be mounted to the frame 102 behind the operator seat 106. The engine can be an internal combustion engine configured to drive a power generator. The power generator then provides electric power to one or more electric motors that drive respective rear wheels such as left wheel 110 and right wheel 112 that propel the vehicle 100, for example. The power generator can also provide power to electric motors that drive the blades of the mower deck 104.

In another example, rather than using an engine and a power generator, the vehicle 100 can be a battery-driven vehicle. Particularly, the vehicle 100 can have a rechargeable battery that provides electric power to drive the various motors.

The steering control levers 108, 109 can be configured to control speed and direction of the wheels 110, 112 via actuating the respective electric motors. Thus, the drive system can be controlled by an operator to drive the wheels 110, 112 independently, and propel the vehicle 100. The configuration of the vehicle 100 is an example configuration and it should be understood that other mower configurations and vehicle types could be used.

The vehicle 100 can have several electric motors. For example, the vehicle 100 can have two traction or propulsion electric motors respectively driving the wheels 110, 112 of the vehicle 100, and may include one or more electric motors driving respective blades mounted to the mower deck 104.

Figure 1B:
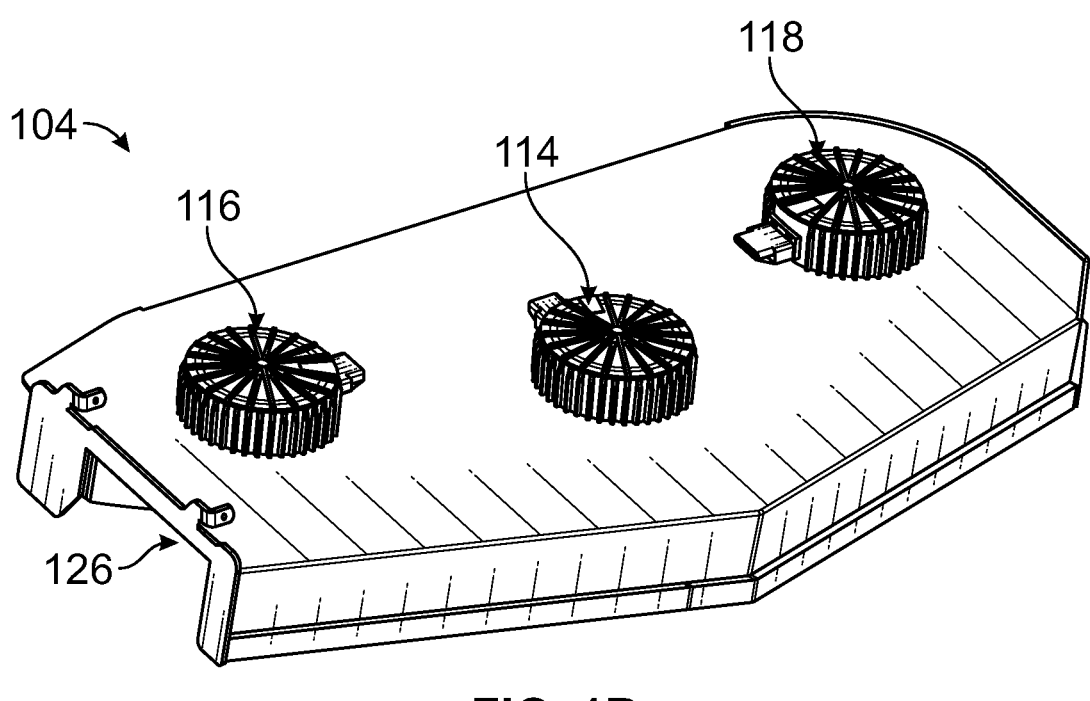
FIG. 1B illustrates a perspective view of a mower deck with electric motors driving blades of the mower deck, according to an example implementation.
Figure 1C:
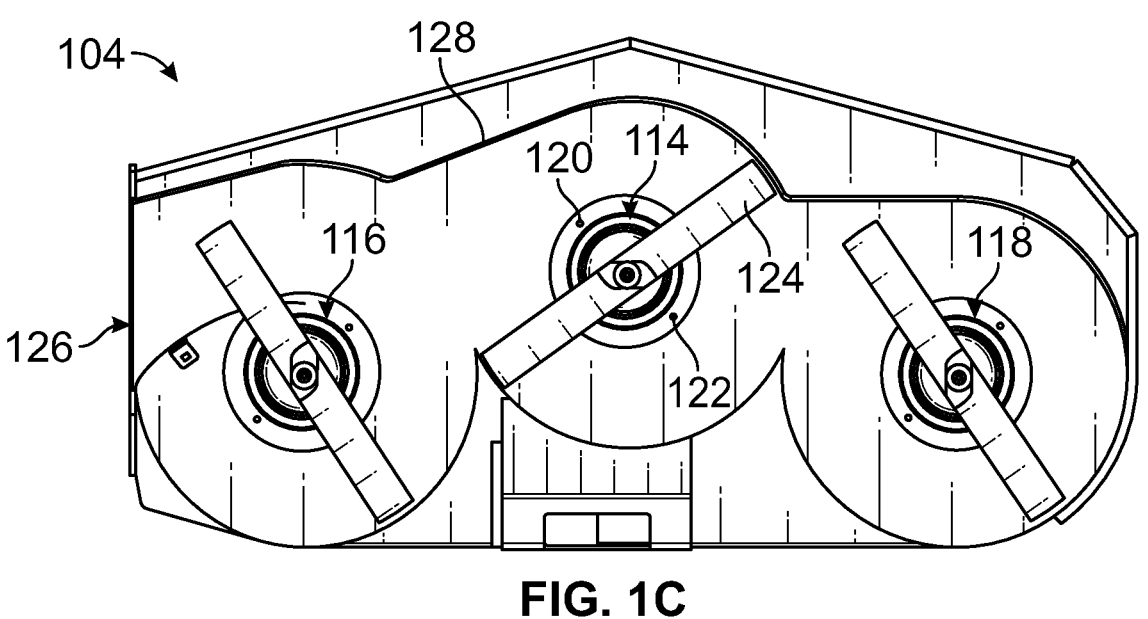
FIG. 1C illustrates a bottom view of the mower deck of FIG. 1B, according to an example implementation.

FIG. 1B illustrates a perspective view of the mower deck 104 with electric motors driving blades of the mower deck 104, and FIG. 1C illustrates a bottom view of the mower deck 104, according to an example implementation. The mower deck 104 can be made of sheet metal for example, and may include a plurality of electric motors such as electric motor 114, electric motor 116, and electric motor 118. Although three electric motors are shown, in other example implementations, more or fewer electric motors and blades could be used.

The electric motors 114-118 can be coupled to the mower deck 104 via fasteners (bolts, screws, etc.). For example, as shown in FIG. 1C, the electric motor 114 is coupled to the mower deck 104 via a bolt 120 and bolt 122.

Referring to FIG. 1C, each of the electric motors 114-118 can be coupled to and is configured to drive a blade for cutting grass. For example, the electric motor 114 is coupled to a blade 124 for cutting grass. The mower deck 104 has an outlet 126 for discharging grass that is cut by the blades of the mower deck 104. The mower deck 104 can include baffles such as baffle 128 that are curved to streamline air flow and direct cut grass to the outlet 126 to be discharged from the mower deck 104.

The vehicle 100 can include a variety of other input devices (e.g., buttons and switches) and may include a plurality of sensors (e.g., an operator presence switch). The vehicle 100 has a control system that can adjust the operating parameters of the vehicle 100 based on input from a plurality of sensors to adapt performance of the vehicle 100 to environmental conditions (e.g., type of terrain, inclination of the terrain, etc.). Particularly, the control system of the vehicle 100 may include multiple IMUs that provide information indicative of one or more of the heading, acceleration, or orientation (e.g., degree of inclination) of the vehicle 100, and the control system is configured to adjust performance parameters of the vehicle 100 based on the sensor information.

Figure 2:
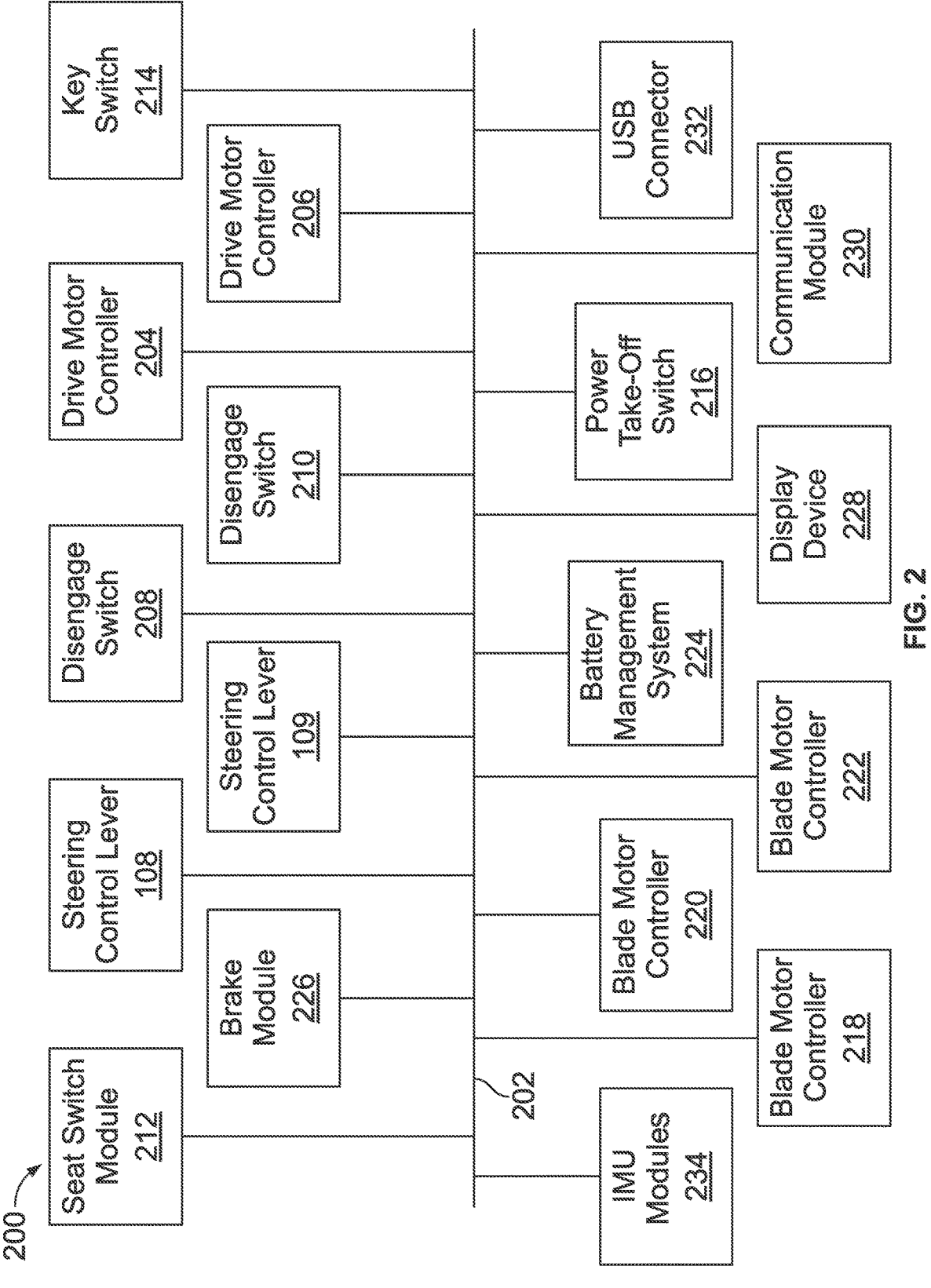
FIG. 2 illustrates a control system, according to an example implementation.

FIG. 2 illustrates a control system 200, according to an example implementation. In the example implementation of FIG. 2, components of the control system 200 are connected directly to a communication bus 202, and communicate continually and directly with each other. In other words, the control system 200 represents an architecture that is distributed or non-centralized, allowing various components (e.g., sensors, devices, switches, control modules, etc.) of the vehicle 100 to communicate with each other directly using a bus communication architecture. Each component may be configured to handle its own safety decisions and behavior.

As an example, the communication bus 202 can be any type of a serial communication bus such as a controller area network (CAN) bus or a universal serial bus (USB). In an example, the communication bus 202 is part of a communication network (e.g., a CAN network) that involves a message-based protocol allowing direct communication between various devices/components of the vehicle 100. For each device, the data in a data frame is transmitted serially in such a way that if more than one device transmits at the same time, the highest priority device can continue while the other devices can back off sending their messages. Data frames are received by all devices, including by the transmitting device. With this configuration, all of the plurality of connected devices of the control system 200 can communicate substantially instantaneously with any and all of the other devices connected to the communication bus 202. Other communication protocols that could be used include Local Interconnect Network (LIN), Inter-Integrated Circuit (I2C), Serial Peripheral Interface (SPI), Universal Asynchronous Receiver/Transmitter (UART), CAN OPEN, RS-485, Ether for Control Automation Technology (Ether CAT), etc.

The devices of the control system 200 can include a battery, a plurality of sensors, input devices, modules, controllers, motors, etc. For example, the control system 200 can include the steering control levers 108, 109 providing signals to the communication bus 202. The signals from the steering control levers 108, 109 may operate as throttle indicators providing an analog voltage signal (e.g., between −5 volts and +5 volts) or CAN messages as throttling commands. The signal from the steering control lever 108 is transmitted via the communication bus 202 to a drive motor controller 204 configured to drive the electric motor propelling the left wheel 110. Similarly, the signal from the steering control lever 109 is transmitted via the communication bus 202 to a drive motor controller 206 configured to drive the electric motor propelling the right wheel 112. In one example, the steering control levers 108, 109 may be connected to a separate communication bus (different from the communication bus 202) on an alternative network to alleviate any latency issues.

In an example, the drive motor controllers 204, 206 can each include a controller and an inverter. The inverter can be configured as a power converter that converts direct current (DC) power received at the inverter (e.g., received from a battery) to three-phase, alternating current (AC) power that can be provided to wire windings of a stator of the respective electric motor to drive the electric motor. The controller may have a microprocessor that provides a pulse width modulated (PWM) signal to operate the power converter of the inverter, for example.

In an example, both of the wheels 110, 112 may be controlled with a single electric motor. In such example, a single drive motor controller may be used.

The control system 200 can include variety of sensors and switches. For example, the control system 200 may include a disengage switch 208 and a disengage switch 210. The disengage switch 208 may be associated with the steering control lever 108, for example. If the steering control lever 108 is placed in a neutral or disengage position (e.g., when the operator wishes to stop the vehicle 100), the disengage switch 208 provides a confirmation that the steering control lever 108 is placed in the neutral position in addition to the signal from the steering control lever 108 indicating a neutral or disengage position.

For example, on some mowers, the steering control lever 108 may be pushed by the operator all the way in one direction to place the steering control lever 108 in a disengage position. The disengage switch 208 may be a mechanical switch, a Hall-Effect sensor, or a magnetic sensor configured to detect that the steering control lever 108 has reached such disengage position. In response, the disengage switch 208 outputs a signal on the communication bus 202 indicating that the steering control lever 108 is in the disengage position, thereby causing the drive motor controller 204 to go to a sleep mode, for example. The disengage switch 210 operates in a similar manner with respect to the steering control lever 109 and the drive motor controller 206.

The control system 200 may further include several sensors or switches that indicate whether the vehicle 100 is ready for operation or should be turned off (or placed in a sleep mode). For example, the control system 200 may include a seat switch module 212 connected to the communication bus 202. The term "module" is used generally herein to include software, hardware, or a combination of software and hardware components. Further, the terms "module," "component," and "device" are used interchangeably. Also, a seat switch module is used herein as the example vehicle used has a seat. In other vehicles, where an operator may be standing, other types of switches could be used. As such, the seat switch module 212 can generally be referred to as an operator presence module.

In an example, the seat switch module 212 has a seat switch that is configured to detect operator presence (e.g., detect whether the operator is seated at the operator seat 106 of the vehicle 100, and is thus about to operate the vehicle 100). The seat switch module 212 can then broadcast on the communication bus 202 whether the operator is present to allow other devices to take appropriate actions (e.g., enable the drive motor controllers 204, 206 to operate their respective electric motors).

The control system 200 can further include key switch 214. If the operator places a key in a key hole or press a "turn on" button (or a combination of the two), the key switch 214 broadcasts a signal to the communication bus 202 for other components to receive an indication that the operator is ready to operate the vehicle 100.

The control system 200 can further include several blade motor controllers to operate the electric motors that drive the blades of the mower deck 104 depending on the number of blades. For example, as shown and described with respect to FIG. 1C, the vehicle 100 may include three electric motors 114-118 driving three respective blades. Each electric motor is controlled by a respective blade motor controller. As such, the control system 200 includes a blade motor controller 218, a blade motor controller 220, and a blade motor controller 222, each blade motor controller operating a respective electric motor coupled to a respective blade.

In an example, the vehicle 100 may have a power take-off (PTO) switch 216 that the operator uses to command the blades (e.g., the blade 124) of the mower deck 104 to spin. As such, activation of the PTO switch 216 by the operator indicates to the blade motor controllers 218-222 of the vehicle 100 that the operator is ready to cut grass and wants the blades to spin.

In an example, when the vehicle 100 is battery-powered, the vehicle 100 includes a battery that may have several battery modules, each module having a respective plurality of battery cells. In this example, the control system 200 can include a battery management system (BMS) 224 configured as an electronic regulator that monitors and controls the charging and discharging of battery modules.

In an example, the BMS 224 may be configured to measure voltages of the battery modules and stop charging them when a desired voltage is reached. Further, the BMS 224 can be configured to monitor parameters that affect life and/or performance of the battery modules as well as ensuring safe operation of the battery modules. Safe operation includes, as examples, operating below a threshold temperature to increase the lifespan of the battery modules, prevent overheating, prevent failure of the battery modules, etc. The BMS 224 can also be configured to balance voltage levels between individual cells of the respective battery modules.

The BMS 224 can further monitor and control main power voltage, battery or cell voltage, charging and discharging rates of the battery modules, temperatures of the battery modules or their individual cells, health of the battery modules or their individual cells, coolant temperature and flow for air or liquid cooling parameters of a cooling system of the battery modules or their individual cells, etc. The BMS 224 may also be configured to limit the amount of current drawn from the battery or provided to the battery during if the battery is in a regeneration mode. As such, the BMS 224 can broadcast signals to the communication bus 202 indicating whether the battery that powers the electric motors is ready (e.g., has enough charge, operating at an acceptable temperature, etc.).

The vehicle 100 may include pedals, levers, a button to engage the parking brakes of the vehicle 100, or the parking brakes may automatically be engaged when the steering control levers 108, 109 are placed in the "neutral" position. If the operator engages the parking brakes, then the operator does not intend to operate the vehicle 100 further, but is rather placing it in a parked position. Thus, the control system 200 can have a brake module 226. In an example, the brake module 226 can have a brake engagement sensor coupled to the parking braking pedal or lever. The brake module 226 is configured to broadcast on the communication bus 202 a signal indicating whether the parking brake is engaged or not based on information from the brake sensor.

In an example, the brake module 226 can be configured to operate brakes that can be applied to the electric motors or the wheels 110, 112 of the vehicle 100 during operation of the vehicle 100 (e.g., to slow down the vehicle 100 or release the brakes from the electric motors or the wheels 110, 112). For instance, the brakes may be electrically or mechanically actuated, and the brake module 226 may be configured to operate the brake actuator to apply or release the brakes as commanded by a controller (e.g., the drive motor controllers 204, 206). The brake module 226 can further include another brake sensor coupled to the electric motors or the wheels 110, 112 to indicate whether brakes are applied to the electric motors or the wheels 110, 112 during operation of the vehicle 100.

Figure 7:
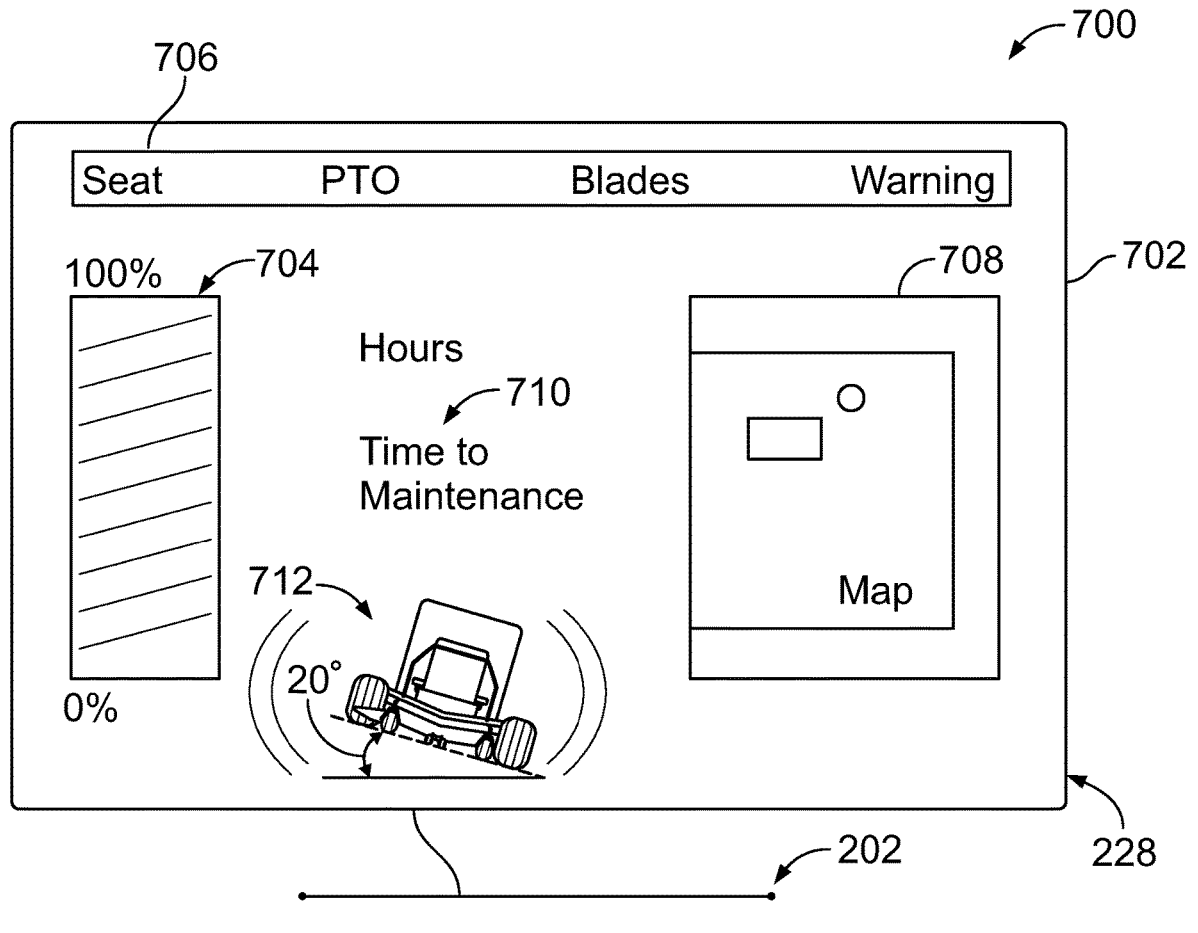
FIG. 7 illustrates a display device, according to an example implementation.

In an example, the control system 200 can further include a display device 228. The display device 228 is configured to display information to the operator of the vehicle 100 and can be used also as an input device. For instance, the display device 228 can include a touchscreen that allows the operator of the vehicle 100 to interact with various components of the control system 200 and obtain various information as desired, while also providing operating commands to components or devices. FIG. 7 described below provides an example of the display device 228 and the information that could be displayed thereon.

In an example, the control system 200 includes a communication module 230. The communication module 230 allows the vehicle 100 to communicate with remote computing devices (e.g., remote servers), for example, using a communication protocol such as CDMA (e.g., 1×RTT or 1×EV-DO), WiMAX, LTE, IDEN, GSM, Wi-Fi, Bluetooth, HSPA, etc.). As an example, the control system 200 may communicate information indicative of a condition of the vehicle 100 and its various components to a server. Such information may be helpful in determining whether the vehicle 100 is due for maintenance, for example. Such a remote server may also be used to communicate software updates to the control system 200, for example, via the communication module 230.

In an example, the control system 200 may include a USB connector 232. The USB connector 232 can be used to plug a computing device (e.g., a laptop) to the vehicle 100 to capture and download data (e.g., diagnostic data) stored in a memory (not shown) of the control system 200, for example. Such computing device can also be used to provide software updates to the control system 200, change calibration parameters of various modules of the control system 200, etc.

The control system 200 further includes multiple IMU modules 234 in communication with the communication bus 202. As described below, the IMU modules 234 may have sensors (e.g., magnetometer, accelerometers, gyroscopes, etc.) that detect a degree of inclination (whether the vehicle 100 is on flat ground or a ramp and the degree of the inclination of the ramp), rate of angular change about yaw, roll or pitch axis, heading, and/or acceleration in three axes (e.g., x, y, and z axes in a Cartesian coordinate system to detect drops, sideways impact, and forward/reverse acceleration) of the vehicle 100. The drive motor controllers 204, 206 may then adjust the parameters of the electric motors (e.g., torque and speed produced by the electric motors coupled to the wheels 110, 112) based on the information from the IMU modules 234.

In one example, the IMU modules 234 may send command signals to the drive motor controllers 204, 206 to adjust the parameters of the electric motors based on the information from the IMU modules 234. In another example, the drive motor controllers 204, 206 receive the sensor information from the IMU modules 234 and responsively adjusts the parameters of the electric motors.

The devices (e.g., components, modules, sensors, etc.) shown in FIG. 2 are examples. More or fewer devices can be used.

Components of the control system 200 may be configured to work in an interconnected fashion with each other and/or with other components coupled to respective systems. One or more of the described operations or components of the control system 200 may be divided up into additional operational or physical components, or combined into fewer operational or physical components. In some further examples, additional operational and/or physical components may be added to the control system 200. Still further, any of the components or modules of the control system 200 may include or be provided in the form of a processor (e.g., a microprocessor, a digital signal processor, etc.) configured to execute program code including one or more instructions for implementing logical operations described herein.

The control system 200 may further include any type of computer readable medium (non-transitory medium) or memory, for example, such as a storage device including a disk or hard drive, to store the program code that when executed by one or more processors cause the control system 200 to perform the operations described above. In an example, the control system 200 may be included within other systems.

Advantageously, each of the devices connected to the communication bus 202 of the control system 200 is in continual, direct communication with all of the other devices via the communication bus 202. Thus, each device transmits and receives signals directly to and from other devices, and may react accordingly without an intermediary device.

Also, advantageously, the IMU modules 234 are configured to provide sensor information indicative of the nature of the terrain on which the vehicle 100 is operating. Particularly, the IMU modules 234 may provide information indicating the degree of inclination of the vehicle 100 (e.g., whether the vehicle 100 is on being driven on flat ground, uphill, or downhill). Responsively, the other devices of the control system 200 may adjust their operating parameters to adapt the performance to the particular environment (e.g., terrain) on which the vehicle 100 is operating.

In some examples, a single IMU placed at a given point or location might not be sufficient to indicate sufficient information to adjust parameters of the vehicle 100 accordingly. Thus, it may be desirable to have multiple IMUs coupled to various locations or points on the vehicle 100. For instance, the multiple EIUs can be attached to respective components disposed at different locations in the vehicle 100.

Figure 2A:
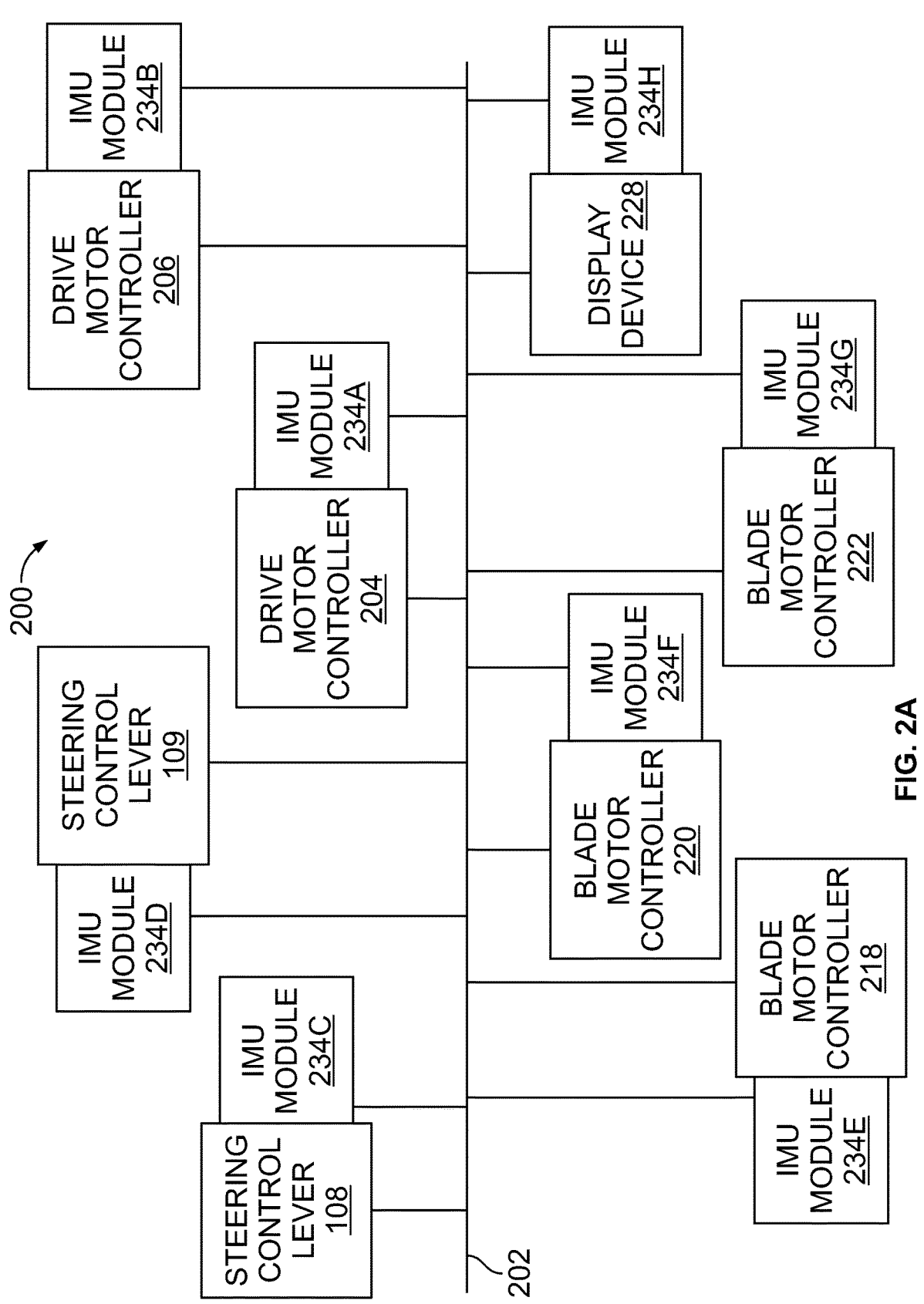
FIG. 2A is a partial block diagram of the control system of FIG. 2 showing multiple inertial measurement unit attached to various components of a vehicle, according to an example implementation.

FIG. 2A is a partial block diagram of the control system 200 showing multiple IMUs attached to various components of the vehicle 100, according to an example implementation. The partial block diagram of the control system 200 does not show many of the components of the control system 200 connected to the communication bus 202 to reduce visual clutter in the drawing. However, it should be understood that other components, modules, or devices are connected to the communication bus 202 as described above with respect to FIG. 2.

As depicted in FIG. 2A, several IMU modules are respectively attached to or incorporated into various components and modules of the vehicle 100. For example, IMU module 234A is coupled to the drive motor controller 204, and IMU module 234B is attached to the drive motor controller 206. In an example, IMU module 234C is coupled to steering control lever 108, and IMU module 234D is coupled to steering control lever 109.

In another example, IMU modules can be attached to the blade motor controllers. For example, IMU module 234E is coupled to the blade motor controller 218, IMU module 234F is coupled to the blade motor controller 220, and IMU module 234G is coupled to the blade motor controller 222. In one example, another IMU module 234H can be coupled to the display device 228 (e.g., a human machine interface device). The IMU modules shown in FIG. 2A are examples. More or fewer IMU modules could be used.

In some examples, in addition or alternative to mounting IMU modules to the drive motor controllers 204, 206 and/or the blade motor controllers 218-222, IMU modules can be coupled directly to the respective electric motors being controlled by the motor controllers. In examples, the motor controllers can be mounted to their respective electric motors. In other words, each motor controller is integrated with its electric motor in an assembly. An IMU module can then be mounted to each such assembly.

Figure 3:
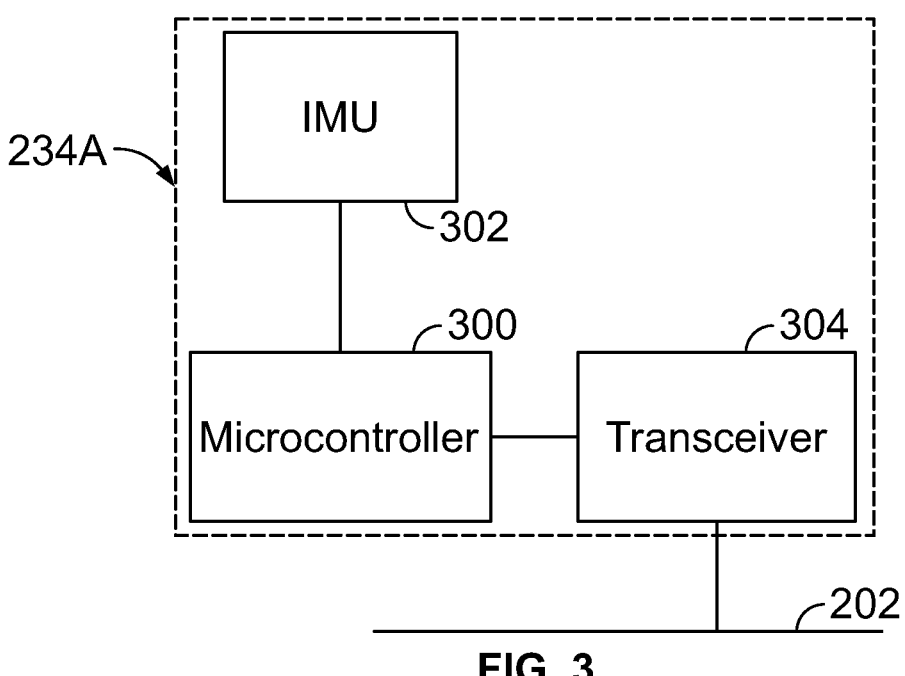
FIG. 3 is a block diagram of an inertial measurement unit module, according to an example implementation.

FIG. 3 is a block diagram of one of the IMU modules 234, according to an example implementation. FIG. 3 depicts the IMU module 234A, but it should be understood that it represents any of the IMU modules 234 described above.

In an example implementation, each of the IMU modules 234 include a microcontroller 300, an IMU 302, and a transceiver 304 (e.g., an electronic device, which is a combination of a radio transmitter and a receiver, that can both transmit and receive radio waves using an antenna, for communication purposes). The microcontroller 300 can include one or more processors (e.g., a microprocessor, a digital signal processor, etc.) configured to execute program code including one or more instructions for implementing the operations described herein with respect to any of the IMU modules 234.

The IMU 302 is an electronic device that uses a combination of accelerometers, gyroscopes, and in some examples magnetometers to measure and provide sensor information indicative of one or more of: (i) specific force acting on or acceleration of the vehicle 100, (ii) angular rate of movement of the vehicle 100, or (iii) the orientation of the vehicle 100. Particularly, the IMU 302 can be configured to detect linear acceleration using one or more accelerometers and detect rotational rate using one or more gyroscopes. As such, the IMU 302 can also provide information indicative of vibration signature or profile at a particular location where it is mounted.

The IMU 302 can include a magnetometer which is commonly used as a heading reference. In an example, the IMU 302 includes one accelerometer, gyroscope, and magnetometer per axis for each of the three principal axes: pitch, roll and yaw. Thus, the IMU 302 may have three accelerometers, three gyroscopes, and three magnetometers.

By having access to this data from the IMU 302, the microcontroller 300 can determine the direction in which the vehicle 100 is traveling, the rate at which the speed of the vehicle 100 is changing, and the angular orientation of the vehicle 100. The microcontroller 300 may broadcast such information on the communication bus 202 via the transceiver 304, and responsively the various devices of the control system 200 adjust their parameters to adapt the performance of the vehicle 100 to the particular operating conditions of the vehicle 100.

Figure 4:
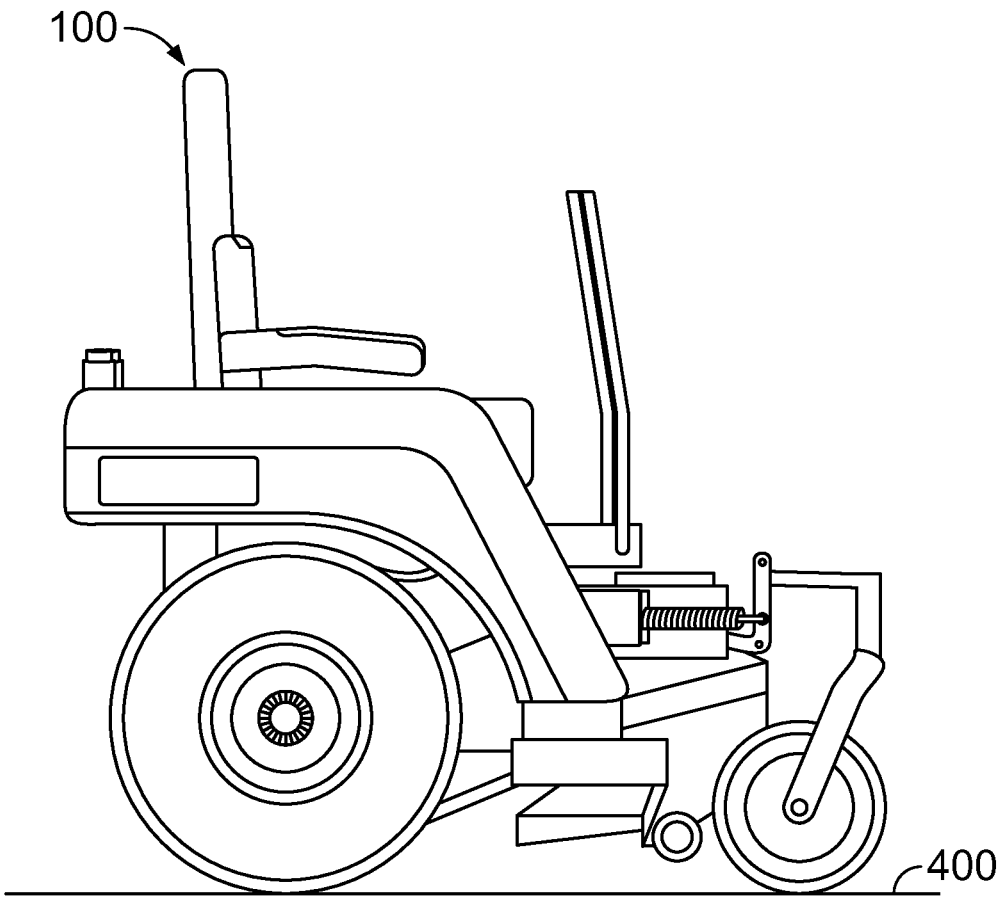
FIG. 4 illustrates a mower on a flat surface, according to an example implementation.
Figure 5:
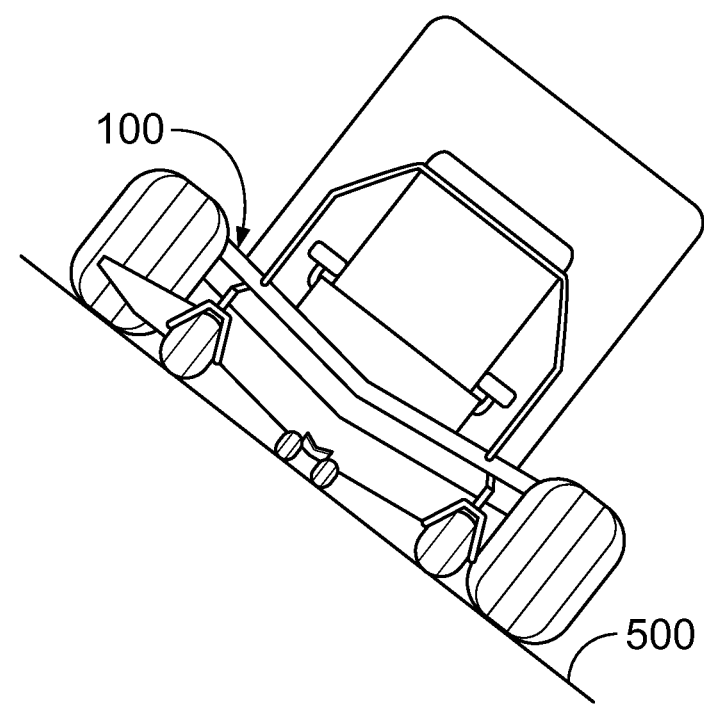
FIG. 5 illustrates a mower on an inclined surface, according to an example implementation.
Figure 6:
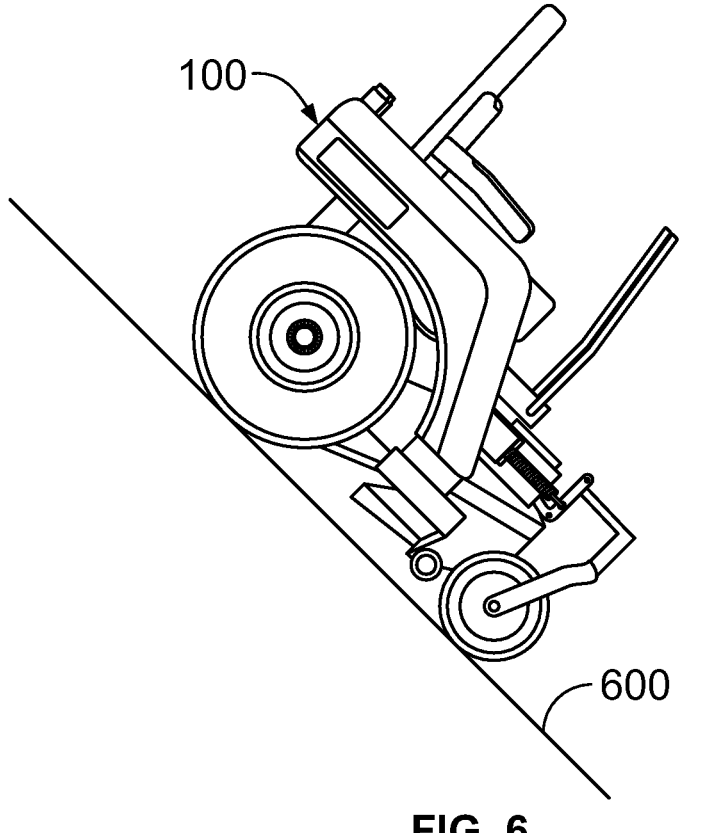
FIG. 6 illustrates a mower being driven downhill, according to an example implementation.

FIG. 4 illustrates the vehicle 100 on a flat surface 400, FIG. 5 illustrates the vehicle 100 on an inclined surface 500, and FIG. 6 illustrates the vehicle 100 being driven downhill on surface 600. The control system 200 is configured to adjust operating parameters of the vehicle 100 based on which type of surface on which the vehicle 100 is operating.

For example, the drive motor controllers 204, 206 receive information via the communication bus 202 from the IMU modules 234 indicating that the vehicle 100 is operating on relatively flat ground such as the flat surface 400. In response, the drive motor controllers 204, 206 adjust the performance characteristics of the electric motors propelling the wheels 110, 112 such that the power to the electric motors is limited to 50% maximum power. This power limitation might prevent skidding of the vehicle 100, damage to the surface on which the vehicle 100 operates, or any other dangerous or unwanted behaviors that could occur on flat ground.

In the operating condition of FIG. 5, the IMU modules 234 may broadcast via the transceiver 304 to the communication bus 202 messages or information indicating that the vehicle 100 is being driven on the inclined surface 500 (e.g., a side slope). Particularly, the information may indicate that the vehicle 100 is on a surface that inclines the vehicle 100 on the right side by an angle greater than 10 degrees, for example. In this case, the drive motor controller 206 of the left wheel 110 receives the information or message, and responsively increases the available power output of the electric motor coupled to the left wheel 110 by 10%, for example. This adjustment in the power may enhance the drivability and controllability of the vehicle 100 on the side slope (i.e. inclined surface 500. As such, the control system 200 is configured such that power provided to a first electric motor coupled to the left wheel 110 can be different from power provided to the second electric motor based on information from the IMU modules 234.

In this position of the vehicle 100, a single IMU module might not provide sufficient information that accurately indicate the state (e.g., inclination) of the vehicle 100. For example, an IMU module on the left side of the vehicle 100 might not provide information that accurately indicate the degree of inclination. Other IMU modules at other locations might provide more accurate information. As such, the various devices and controllers (e.g., the drive motor controllers 204, 206) receive information from the various or multiple IMU modules 234 to determine the degree of inclination accurately. For example, each device or controller can fuse the sensor information, assign different respective weights to the information from the various IMU modules, discard some IMU modules while taking information from other IMU modules into account, etc.

For example, based on an indicated inclination, the controller may assign larger weights to some of the IMU modules than others. The controller can then determine a weighted average of the indicated inclinations by each IMU modules of the plurality of IMU modules.

Particularly, the controller can determine the average speed as follows:

$$\text{Inclination} = \frac{\sum_{i=1}^{n} \omega_i IMU_i}{\sum_{i=1}^{n} \omega_i}$$

where $\omega_i$ are the weights assigned to each inclination indicated by individual IMUs ($IMU_i$). As such, some of the IMUs can be assigned small weights to reduce their influence, while others may be assigned larger weights. In some cases, the weight assigned to a particular IMU can be set as zero to eliminate its influence.

As such, it may be advantageous to have several IMU modules to provide accurate information related to the inclination, heading, acceleration, etc. of the vehicle 100.

Referring to FIG. 6, the vehicle 100 is driven in a downhill facing orientation on the surface 600. In this condition, it may be desirable to limit the power that propels the vehicle 100 forward. It may also be beneficial in this condition to apply significantly more braking force (e.g., via the brake module 226) to the wheels 110, 112 when commanding the vehicle 100 to slow down with the steering control levers 108, 109. As such, the drive motor controllers 204, 206 can adjust the power provided to the propulsion electric motors, and the brake module 226 can adjust the brake force applied to the electric motors or the wheels 110, 112 based on the operating conditions of the vehicle 100.

As another example, during flat ground operation as shown in FIG. 4, the force that is applied to decelerate the vehicle 100 when an operator moves the steering control levers 108, 109 from 50% forward to 25% forward could be limited to 20% of the maximum deceleration. On the other hand, in the case of a downhill operation as shown in FIG. 6, when an operator moves the steering control levers 108, 109 from 50% forward to 25% forward, the force that is applied to decelerate the vehicle 100 could be increased to 75% of the maximum deceleration. This adjustment may allow for enhanced and safe operation of the vehicle 100 in each operating condition.

Other modules can also respond to the different operating conditions of the vehicle 100. For example, if the IMU modules 234 output messages indicating that the vehicle 100 is in the condition shown in FIG. 5 (e.g., the vehicle 100 on a surface that inclines the vehicle 100 on the right side by an angle greater than 10 degrees), and the seat switch module 212 indicates that the operator has left the operator seat 106, the brake module 226 can responsively command the brakes of the left side (e.g., of the left wheel 110) to be applied. On the flat surface 400, the brake module 226 may attempt to slow down the vehicle 100 first instead of suddenly stopping the vehicle 100. If the vehicle 100 is going uphill, the brake module 226 may apply the brakes immediately. On the other hand, if the vehicle 100 is going downhill on the surface 600, the brake module 226 may command the brakes to slow the vehicle 100 down then stop the vehicle 100. As such, different operating conditions indicated by the IMU modules 234 trigger different adjustments from the different modules of the control system 200.

In one example, adjustments to the performance characteristics or parameters could be based on look-up tables. An example table may include entries for different conditions detected by the IMU modules 234, and a corresponding adjustment to the power or torque output, as shown in Table 1 below. The conditions and actions listed in Table 1 are examples for illustration only.

TABLE 1

| Information from the IMU modules 234 indicating: | Adjustment to Power to Electric Motors |
|---|---|
| Flat ground | Limit power to 50% of maximum power |
| Uphill slope greater than 10% | Limit power for forward propulsion to 75% of maximum power available |
| Downhill slope greater than 10% | Limit deceleration in forward direction to 75% of maximum available deceleration |
| Side hill left slope greater than 10% | Increase power to right side by 20% |
| Side hill right slope greater than 10% | Increase power to left side by 20% |

In other examples, rather than using discrete values such as 50%, 75%, etc., the power limitations and adjustments can be varied along a continuum of values between 0% and 100% based on the condition. For instance, the drive motor controllers 204, 206 may have access to several curves indicating the relationship between slope inclination and adjustments to power along a continuum of variations under different conditions.

In examples, information from the IMU modules 234 could be used by the various modules to limit performance of the vehicle 100 in some operating conditions. For example, the blade motor controllers 218-228 may adjust operation of the electric motors 114-118 based on the sensor information from the IMU modules 234. As an example for illustration, if the vehicle 100 is operating on a hill with an inclination that is greater than a threshold inclination (e.g., greater than 15 degrees), the blade motor controllers 218-222 may responsively cause the electric motors 114-118 to stop spinning their respective blades for safety reasons and to prevent damage to the blades or other components of the vehicle 100. As such, rather than the manufacturer of the vehicle 100 providing warnings to the user not to operate the vehicle 100 under some conditions, the various modules can be configured to automatically respond to such operating conditions detected by the IMU modules 234 with actions to protect the vehicle 100.

As mentioned above, it may be advantageous to have several IMU modules 234 to provide accurate information related to the inclination, heading, acceleration, etc. of the vehicle 100 to the various devices. The devices can process the information from the IMU modules 234 to determine the vehicle condition accurately.

In examples, the IMU modules 234 can detect some operating conditions, and responsively generate an alert to the operator or to a remote server. For example, the IMU modules 234 may detect that the vehicle 100 has experienced a rollover due to operating or being parked on a sloped surface. Responsively, the microcontroller 300 of at least one of the IMU modules 234 may generate a rollover alert to the operator and/or or to the communication module 230, which may then send an emergency alert to the remote server.

As mentioned above, the control system 200 may include the display device 228 connected to the communication bus 202. The display device 228 includes a processor that is configured to generate a display of a graphical user interface (GUI) depicting information received via the communication bus 202. In an example, the IMU module 234H is coupled to the display device 228.

FIG. 7 illustrates the display device 228, according to an example implementation. The display device 228 has a processor configured to generate a display of, or visually present, a GUI 700 on a screen 702 (e.g., a touchscreen) to allow the operator to monitor the state of the vehicle 100. In an example, the display device 228 may allow the operator to interact with the vehicle 100 through user-selectable on-screen graphical items (e.g., buttons, menus, widgets, scroll bars, graphical objects, audio indicators, icons, etc.) to facilitate user-interaction.

The GUI 700 shows data associated with the various devices of the control system 200, for example. For instance, the GUI 700 may include a battery indicator 704 providing a visual representation of the charge state of the battery of the vehicle 100, if the vehicle 100 is battery-driven.

In another example, the GUI 700 may include a status bar 706 that conveys information associated with various devices or sensors of the vehicle 100 such as presence of the operator (via the seat switch module 212), status of the PTO switch 216, status of the blades (e.g., whether the blades are spinning), and any warnings associated with any of the components of the vehicle 100.

In an example, the GUI 700 may include a box 708 displaying information associated with an environment and location of the vehicle 100 such as a map, a temperature of an environment of the vehicle 100, etc. In an example, the GUI 700 may include a maintenance indicator 710 displaying a number of operating hours left till the next maintenance is due.

In an example, the GUI 700 may include information received from at least one of the IMU modules 234 (e.g., the IMU module 234H integrated with or coupled to the display device 228) as an inclination indicator 712. The inclination indicator 712 displays information, graphical and/or textual, associated with a degree of inclination of the vehicle 100 to provide a warning to the operator if the inclination or tilt of the vehicle 100 exceeds a threshold angle, for example.

The display information shown in FIG. 7 are example for illustration only. The GUI 700 may show information from any of the other devices described above. The GUI 700 may also enable the operator to provide user inputs through the screen 702 or other input devices (e.g., buttons, switches, etc.).

In one example, data collected from the IMU modules 234 is collected and stored locally on the vehicle 100 (e.g., on a memory mounted to the vehicle 100). The locally stored data can later be downloaded or retrieved for analysis of the data. In another example, additionally or alternatively, data from the IMU modules 234 can be sent to a remote storage system (e.g., cloud severs) for storage, processing, and analysis.

In examples, in addition to providing information indicating orientation, heading, etc. of the vehicle 100, the IMU modules 234 can also provide data that identify problems or potential problems that has occurred or are likely to occur on the vehicle 100.

For example, during initial operation of the vehicle 100, the IMU modules 234 can collect data that represent baseline vibration profiles at different components of the vehicle 100 to which the IMU modules 234 are respectively attached. Such baseline profiles represent normal operational profiles or parameters for vibration of the vehicle 100.

Later, during operation of the vehicle 100, the same vibration data can be collected via the IMU modules 234 and compared to the baseline profiles. Deviations from the baseline profile may indicate that maintenance might be required for a given component of the vehicle 100. For example, the normal vibration signature or profile of one of the electric motors 114-118 of the blades may be minimal, but the vibration of the electric motor with a damaged or dull blade may be substantially higher. Thus, if data indicate a substantial increase in vibrations, an operator may determine that maintenance or replacement might be required for a given blade.

As another example, if a bearing of one of the drive electric motors fails, vibration profile of such motor changes. Such change indicates to the operator that maintenance is required for such motor.

Having multiple IMU modules advantageously enables analyzing individual accelerometer data to identify vibrations at specific parts of the vehicle 100. For example, an IMU module mounted on a blade motor controller (e.g., any of the blade motor controllers 218-222) or a blade electric motor (any of the electric motors 114-118) may detect acceleration data that is different from acceleration data detected by another IMU module mounted to one of the drive motor controllers 204, 206 or the traction electric motors. The IMU module coupled to a blade electric motor may be able to detect a different vibration profile or pattern caused by a faulty blade/bearing/motor that would be isolated from, and thus not detected by, an IMU module coupled to a drive motor controller or drive electric motor. On the other hand, the IMU module coupled to a drive motor controller or drive electric motor may be able to detect abnormal vibrations at the drive electric motor that might be isolated from, and thus not detected by, the IMU module coupled to the blade motor controller or blade electric motor.

Thus, in an application where there are IMU modules, e.g., an IMU module placed on each blade motor controller or blade electric motor, it is possible to isolate and detect which of the blade electric motors may be having a problem or may require maintenance. Similarly, one of the drive electric motors (e.g., the electric motor driving the left wheel 110) may be having a problem indicated by abnormal vibration that the other drive electric motor (e.g., the electric motor driving the right wheel 112) might not exhibit. This configuration with multiple IMU modules enables the control system to identify which drive electric motor might need attention. Thus, by including multiple IMU modules in the control system, identifying or isolating issues related to individual components may be enhanced.

Thus, by collecting this data from the IMU modules 234, storing it, and analyzing it over time, predictions can be made regarding when repairs, maintenance, or replacement of parts may be due.

Figure 8:
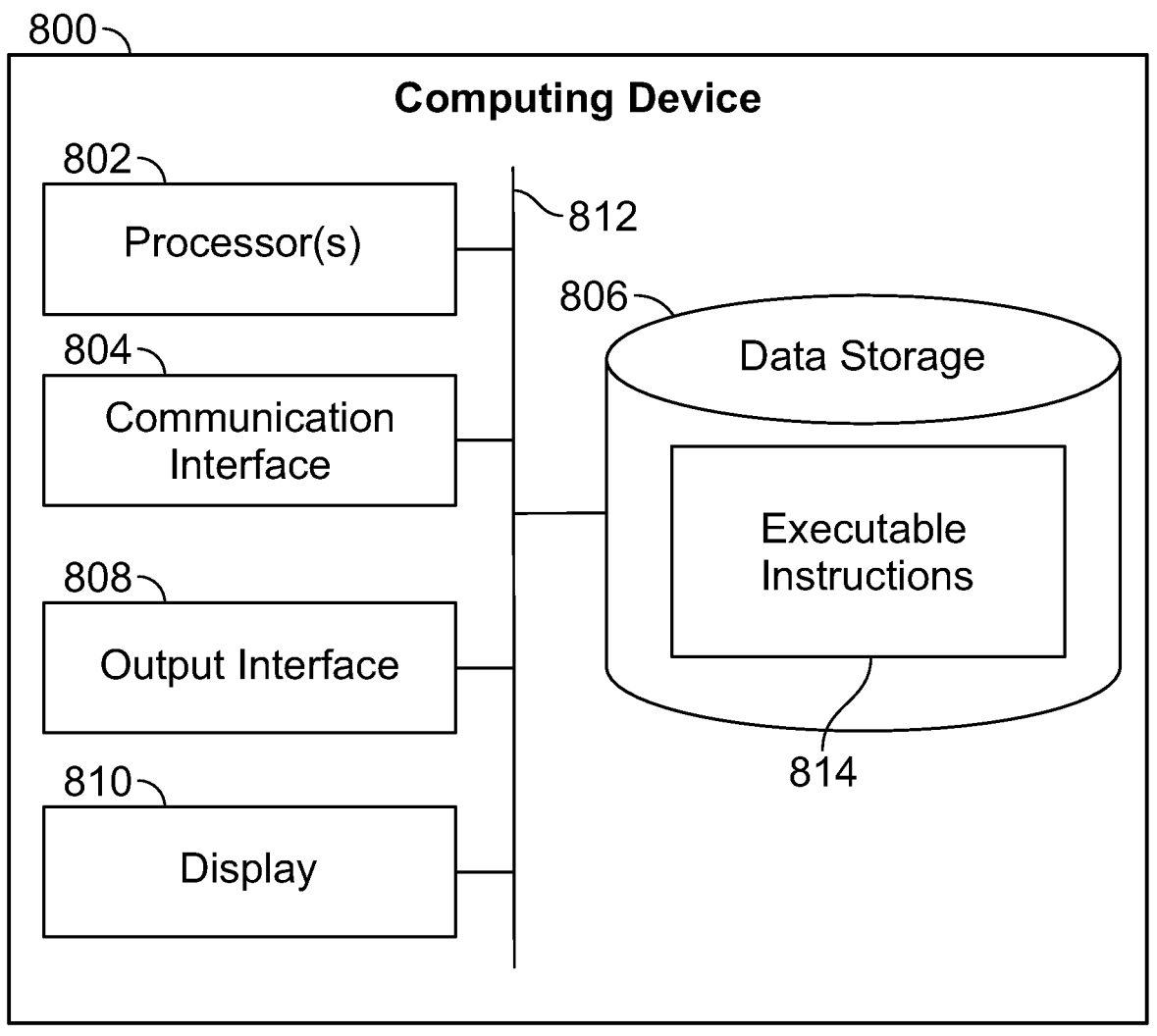
FIG. 8 is a block diagram of a computing device, according to an example implementation.

FIG. 8 is a block diagram of a computing device 800, according to an example implementation. The computing device 800 can represent, or can be included in, any of the devices and sensors described above (e.g., the seat switch module 212, the drive motor controllers 204, 206, the blade motor controllers 218-222, the display device 228, the BMS 224, any of the IMU modules 234, any of the sensors, switches, or input devices shown in FIGS. 2, 2A, 3, etc.).

The computing device 800 may have processor(s) 802, a communication interface 804, and data storage 806, each connected to a communication bus 812. The computing device 800 may also include hardware to enable communication within the computing device 800 and between the computing device 800 and the communication bus 202. The hardware may include transmitters, receivers, and antennas, for example.

The communication interface 804 may be a wireless interface and/or one or more wireline interfaces that allow for both short-range communication and long-range communication to one or more networks or to one or more remote devices (e.g., to allow communication with the communication bus 202). Such wireless interfaces may provide for communication under one or more wireless communication protocols, Bluetooth, Wi-Fi (e.g., an institute of electrical and electronic engineers (IEEE) 802.11 protocol), Long-Term Evolution (LTE), cellular communications, near-field communication (NFC), and/or other wireless communication protocols. Wireline interfaces may include an Ethernet interface, a CAN network interface, a USB interface, or similar interface to communicate via a wire, a twisted pair of wires, a coaxial cable, an optical link, a fiber-optic link, or other physical connection to a wireline network. Thus, the communication interface 804 may be configured to receive input data from the communication bus 202, and may be configured to send output data to the communication bus 202.

The data storage 806 may include or take the form of one or more computer-readable storage media that can be read or accessed by the processor(s) 802. The computer-readable storage media can include volatile and/or non-volatile storage components, such as optical, magnetic, organic or other memory or disc storage, which can be integrated in whole or in part with the processor(s) 802. The data storage 806 is considered non-transitory computer readable media. In some examples, the data storage 806 can be implemented using a single physical device (e.g., one optical, magnetic, organic or other memory or disc storage unit), while in other examples, the data storage 806 can be implemented using two or more physical devices.

The data storage 806 thus is a non-transitory computer readable storage medium, and executable instructions 814 are stored thereon. The executable instructions 814 include computer executable code. When the executable instructions 814 are executed by the processor(s) 802, the processor(s) 802 are caused to perform operations of the computing device 800 (e.g., operations performed by any of the devices, modules, sensors described above).

The processor(s) 802 may be a general-purpose processor or a special purpose processor (e.g., digital signal processors, application-specific integrated circuits (ASIC), etc.). The processor(s) 802 may receive inputs from the communication interface 804, and process the inputs to generate outputs that are stored in the data storage 806. The processor(s) 802 can be configured to execute the executable instructions 814 (e.g., computer-readable program instructions) that are stored in the data storage 806 and are executable to provide the functionality of the computing device 800 described herein.

If the computing device 800 represents the display device 228, the computing device 800 can further include an output interface 808 and a display 810 (which may represent the screen 702, for example). The output interface 808 outputs information to the display 810 or to other components as well. Thus, the output interface 808 can be a wireless interface (e.g., transmitter) or a wired interface as well. The processor(s) 802 may receive inputs from the communication interface 804, and process the inputs to generate outputs to the display 810.

FIG. 9 is a flowchart of a method 900 for operating the vehicle 100, according to an example implementation. The method 900 can be implemented by one or more components of the control system 200, for example.

The method 900 may include one or more operations, or actions as illustrated by one or more of blocks 902-904. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 900 and other processes and operations disclosed herein, the flowchart shows operation of one possible implementation of present examples. In this regard, each block may represent a module, a segment, or a portion of program code, which includes one or more instructions executable by a processor (e.g., the processor(s) 802 of the computing device 800) for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 900 and other processes and operations disclosed herein, one or more blocks in FIG. 9 may represent circuitry or digital logic that is arranged to perform the specific logical operations in the process.

At block 902, the method 900 includes receiving, at an at least one drive motor controller (e.g., one or both of the drive motor controllers 204, 206) that controls at least one electric motor to propel the vehicle 100, sensor information from a plurality of inertial measurement unit (IMU) modules (the IMU modules 234) coupled to various locations on the vehicle 100 including the at least one drive motor controller or the at least one electric motor, wherein the sensor information indicates one or more of heading, acceleration, rate of angular change, or orientation of the vehicle 100.

At block 904, the method 900 includes adjusting operation of the at least one electric motor based on the sensor information.

The method 900 can further include any of the steps performed by the control system 200 or the devices thereof as described throughout herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to those with skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a vehicle comprising: at least one electric motor that propels the vehicle; at least one drive motor controller that controls the at least one electric motor to propel the vehicle; and a plurality of inertial measurement unit (IMU) modules coupled to various locations on the vehicle including the at least one drive motor controller or the at least one electric motor, wherein the plurality of IMU modules provide sensor information indicative of one or more of heading, acceleration, or orientation of the vehicle, wherein the at least one drive motor controller receives the sensor information from the plurality of IMU modules, and responsively adjusts operation of the at least one electric motor based on the sensor information.

EEE 2 is the vehicle of EEE 1, further comprising: at least one vehicle movement input device that sends commands to the at least one drive motor controller to operate the at least one electric motor, wherein the plurality of IMU modules include an IMU module coupled to the at least one vehicle movement input device.

EEE 3 is the vehicle of any of EEEs 1-2, further comprising: a display device operating as a human machine interface, wherein the plurality of IMU modules include an IMU module coupled to the display device.

EEE 4 is the vehicle of any of EEEs 1-3, wherein each IMU module of the plurality of IMU module comprises: an IMU having one or more of an accelerometer, a gyroscope, or a magnetometer; a microcontroller that receives information from the IMU and generates the sensor information; and a transceiver that provides the sensor information to a communication bus of the vehicle.

EEE 5 is the vehicle of any of EEEs 1-4, wherein the at least one drive motor controller comprises: a first motor controller controlling a first electric motor; and a second motor controller controlling a second electric motor, wherein the plurality of IMU modules include a first IMU module coupled to the first motor controller, and a second IMU module coupled to the second electric motor.

EEE 6 is the vehicle of any of EEEs 1-5, further comprising: a mower deck comprising at least one respective electric motor that spins one or more blades disposed in the mower deck; and at least one blade motor controller controlling the at least one respective electric motor of the mower deck, wherein the plurality of IMU modules include an IMU module coupled to the at least one blade motor controller.

EEE 7 is the vehicle of EEE 6, wherein the sensor information indicates a degree of inclination of the vehicle, and wherein the at least one blade motor controller causes the at least one respective electric motor to slow down or stop spinning the one or more blades when the sensor information indicates that the vehicle is on an inclined surface having an inclination that is greater than a threshold inclination.

EEE 8 is the vehicle of any of EEEs 1-7, wherein the at least one drive motor controller performs operations comprising: assigning respective weights to respective inclinations indicated by individual IMUs of the plurality of IMU modules; and determining an inclination of the vehicle based on a weighted average of the respective inclinations, wherein adjusting operation of the at least one electric motor is based on the inclination of the vehicle.

EEE 9 is the vehicle of any of EEEs 1-8, wherein the sensor information indicates a degree of inclination of the vehicle, and wherein the at least one drive motor controller limits power available to the at least one electric motor when the sensor information indicates that the vehicle is on flat ground.

EEE 10 is the vehicle of any of EEEs 1-9, wherein the sensor information indicates a degree of inclination and heading of the vehicle, and wherein the at least one drive motor controller increases power available to the at least one electric motor when the sensor information indicates that the vehicle is being driven uphill.

EEE 11 is the vehicle of any of EEEs 1-10, wherein the sensor information indicates a degree of inclination and heading of the vehicle, and wherein the at least one drive motor controller increases deceleration power available to the at least one electric motor when the sensor information indicates that the vehicle is being driven downhill.

EEE 12 is the vehicle of any of EEEs 1-11, further comprising: a first wheel; and a second wheel, wherein the at least one electric motor propels the first wheel and the second wheel, wherein the sensor information indicates a degree of inclination of the vehicle, and wherein the at least one drive motor controller increases power available to drive the second wheel when the sensor information indicates that the first wheel of the vehicle is on an inclined surface relative to the second wheel of the vehicle.

EEE 13 is a method comprising: receiving, at an at least one drive motor controller that controls at least one electric motor to propel a vehicle, sensor information from a plurality of inertial measurement unit (IMU) modules coupled to various locations on the vehicle including the at least one drive motor controller or the at least one electric motor, wherein the sensor information indicates one or more of heading, acceleration, rate of angular change, or orientation of the vehicle; and adjusting operation of the at least one electric motor based on the sensor information.

EEE 14 is the method of EEE 13, wherein the vehicle further comprises: a mower deck comprising at least one respective electric motor that spins one or more blades disposed in the mower deck, and at least one blade motor controller controlling the at least one respective electric motor of the mower deck, wherein the plurality of IMU modules include an IMU module coupled to the at least one blade motor controller, and wherein the method further comprises: determining, based on the sensor information, that the vehicle is on an inclined surface having an inclination that is greater than a threshold inclination; and responsively, causing, by the at least one blade motor controller, the at least one respective electric motor to slow down or stop spinning the one or more blades.

EEE 15 is the method of any of EEEs 13-14, further comprising: assigning respective weights to respective inclinations indicated by individual IMUs of the plurality of IMU modules; and determining an inclination of the vehicle based on a weighted average of the respective inclinations, wherein adjusting operation of the at least one electric motor is based on the inclination of the vehicle.

EEE 16 is the method of any of EEEs 13-15, further comprising: determining, based on the sensor information, that the vehicle is on flat ground; and responsively, limiting power available to the at least one electric motor.

EEE 17 is the method of any of EEEs 13-16, further comprising: determining, based on the sensor information, that the vehicle is being driven uphill; and responsively, increasing power available to the at least one electric motor.

EEE 18 is the method of any of EEEs 13-17, further comprising: determining, based on the sensor information, that the vehicle is being driven downhill; and increasing deceleration power available to the at least one electric motor.

EEE 19 is the method of any of EEEs 13-18, wherein the vehicle further comprises a first wheel and a second wheel, wherein the at least one electric motor propels the first wheel and the second wheel, and wherein the method further comprises: determining, based on the sensor information, that the first wheel of the vehicle is on an inclined surface relative to the second wheel of the vehicle; and responsively, increasing power available to drive the second wheel.

EEE 20 is the method of any of EEEs 13-19, wherein the plurality of IMU modules further provide vibration information indicative of respective vibration profiles at different components of the vehicle to which the plurality of IMU modules are coupled, and wherein the method further comprises: comparing the respective vibration profiles to baseline vibration profiles; determining that a given vibration profile of the respective vibration profiles associated with a respective component has deviated from a corresponding baseline vibration profile; and providing information related to maintenance of the respective component.

What is claimed is:

1. A vehicle comprising:
at least one electric motor that propels the vehicle;
at least one drive motor controller that controls the at least one electric motor to propel the vehicle; and
a plurality of inertial measurement unit (IMU) modules attached to various components at various locations on the vehicle including being attached to the at least one drive motor controller or the at least one electric motor, wherein the plurality of IMU modules provide sensor information indicative of one or more of heading, acceleration, or orientation of the vehicle, wherein the at least one drive motor controller receives the sensor information from the plurality of IMU modules, and responsively adjusts operation of the at least one electric motor based on the sensor information.

2. The vehicle of claim 1, further comprising:
at least one vehicle movement input device that sends commands to the at least one drive motor controller to operate the at least one electric motor, wherein the plurality of IMU modules include an IMU module coupled to the at least one vehicle movement input device.

3. The vehicle of claim 1, further comprising:
a display device operating as a human machine interface, wherein the plurality of IMU modules include an IMU module coupled to the display device.

4. The vehicle of claim 1, wherein each IM module of the plurality of IMU module comprises:
an IMU having one or more of an accelerometer, a gyroscope, or a magnetometer;
a microcontroller that receives information from the IMU and generates the sensor information; and
a transceiver that provides the sensor information to a communication bus of the vehicle.

5. The vehicle of claim 1, wherein the at least one drive motor controller comprises:
a first motor controller controlling a first electric motor; and
a second motor controller controlling a second electric motor, wherein the plurality of IMU modules include a first IMU module coupled to the first motor controller, and a second IMU module coupled to the second electric motor.

6. The vehicle of claim 1, further comprising:
a mower deck comprising at least one respective electric motor that spins one or more blades disposed in the mower deck; and
at least one blade motor controller controlling the at least one respective electric motor of the mower deck, wherein the plurality of IMU modules include an IMU module coupled to the at least one blade motor controller.

7. The vehicle of claim 6, wherein the sensor information indicates a degree of inclination of the vehicle, and wherein the at least one blade motor controller causes the at least one respective electric motor to slow down or stop spinning the one or more blades when the sensor information indicates that the vehicle is on an inclined surface having an inclination that is greater than a threshold inclination.

8. The vehicle of claim 1, wherein the at least one drive motor controller performs operations comprising:
assigning respective weights to respective inclinations indicated by individual IMUs of the plurality of IMU modules; and
determining an inclination of the vehicle based on a weighted average of the respective inclinations, wherein adjusting operation of the at least one electric motor is based on the inclination of the vehicle.

9. The vehicle of claim 1, wherein the sensor information indicates a degree of inclination of the vehicle, and wherein the at least one drive motor controller limits power available to the at least one electric motor when the sensor information indicates that the vehicle is on flat ground.

10. The vehicle of claim 1, wherein the sensor information indicates a degree of inclination and heading of the vehicle, and wherein the at least one drive motor controller increases power available to the at least one electric motor when the sensor information indicates that the vehicle is being driven uphill.

11. The vehicle of claim 1, wherein the sensor information indicates a degree of inclination and heading of the vehicle, and wherein the at least one drive motor controller increases deceleration power available to the at least one electric motor when the sensor information indicates that the vehicle is being driven downhill.

12. The vehicle of claim 1, further comprising:
a first wheel; and
a second wheel, wherein the at least one electric motor propels the first wheel and the second wheel, wherein the sensor information indicates a degree of inclination of the vehicle, and wherein the at least one drive motor controller increases power available to drive the second wheel when the sensor information indicates that the first wheel of the vehicle is on an inclined surface relative to the second wheel of the vehicle.

13. A method comprising:
receiving, at an at least one drive motor controller that controls at least one electric motor to propel a vehicle, sensor information from a plurality of inertial measurement unit (IMU) modules attached to various components at various locations on the vehicle including being attached to the at least one drive motor controller or the at least one electric motor, wherein the sensor information indicates one or more of heading, acceleration, rate of angular change, or orientation of the vehicle; and adjusting operation of the at least one electric motor based on the sensor information.

14. The method of claim 13, wherein the vehicle further comprises: a mower deck comprising at least one respective electric motor that spins one or more blades disposed in the mower deck, and at least one blade motor controller controlling the at least one respective electric motor of the mower deck, wherein the plurality of IMU modules include an IMU module coupled to the at least one blade motor controller, and wherein the method further comprises:

determining, based on the sensor information, that the vehicle is on an inclined surface having an inclination that is greater than a threshold inclination; and responsively, causing, by the at least one blade motor controller, the at least one respective electric motor to slow down or stop spinning the one or more blades.

15. The method of claim 13, further comprising:

assigning respective weights to respective inclinations indicated by individual IMUs of the plurality of IMU modules; and determining an inclination of the vehicle based on a weighted average of the respective inclinations, wherein adjusting operation of the at least one electric motor is based on the inclination of the vehicle.

16. The method of claim 13, further comprising:

determining, based on the sensor information, that the vehicle is on flat ground; and responsively, limiting power available to the at least one electric motor.

17. The method of claim 13, further comprising:

determining, based on the sensor information, that the vehicle is being driven uphill; and responsively, increasing power available to the at least one electric motor.

18. The method of claim 13, further comprising:

determining, based on the sensor information, that the vehicle is being driven downhill; and increasing deceleration power available to the at least one electric motor.

19. The method of claim 13, wherein the vehicle further comprises a first wheel and a second wheel, wherein the at least one electric motor propels the first wheel and the second wheel, and wherein the method further comprises:

determining, based on the sensor information, that the first wheel of the vehicle is on an inclined surface relative to the second wheel of the vehicle; and responsively, increasing power available to drive the second wheel.

20. The method of claim 13, wherein the plurality of IMU modules further provide vibration information indicative of respective vibration profiles at different components of the vehicle to which the plurality of IMU modules are coupled, and wherein the method further comprises:

comparing the respective vibration profiles to baseline vibration profiles;

determining that a given vibration profile of the respective vibration profiles associated with a respective component has deviated from a corresponding baseline vibration profile; and providing information related to maintenance of the respective component.

* * * * *